(12) United States Patent
Baldemair et al.

(10) Patent No.: US 8,655,394 B2
(45) Date of Patent: Feb. 18, 2014

(54) METHOD AND ARRANGEMENT IN A CELLULAR COMMUNICATION SYSTEM

(75) Inventors: Robert Baldemair, Solna (SE); David Astely, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 274 days.

(21) Appl. No.: 13/256,341

(22) PCT Filed: Feb. 24, 2010

(86) PCT No.: PCT/SE2010/050215
§ 371 (c)(1), (2), (4) Date: Sep. 13, 2011

(87) PCT Pub. No.: WO2010/107365
PCT Pub. Date: Sep. 23, 2010

(65) Prior Publication Data
US 2012/0009960 A1    Jan. 12, 2012

Related U.S. Application Data

(60) Provisional application No. 61/160,475, filed on Mar. 16, 2009.

(51) Int. Cl.
*H04W 92/00* (2009.01)
(52) U.S. Cl.
USPC ........... 455/507; 455/502; 375/260; 375/316; 375/259; 375/285; 375/343; 375/346
(58) Field of Classification Search
USPC ................. 375/260, 316, 259, 285, 343, 346; 455/507, 502
See application file for complete search history.

(56) References Cited

U.S. PATENT DOCUMENTS

| 7,046,740 | B2* | 5/2006 | Dowling | 375/296 |
| 7,177,378 | B2* | 2/2007 | Baldemair et al. | 375/348 |
| 7,519,132 | B2* | 4/2009 | Dowling | 375/296 |
| 2003/0007573 | A1* | 1/2003 | Baldemair et al. | 375/316 |
| 2004/0028148 | A1* | 2/2004 | Dowling | 375/296 |
| 2005/0053170 | A1 | 3/2005 | Catreux et al. | |
| 2009/0245169 | A1* | 10/2009 | Zhang et al. | 370/328 |
| 2010/0091905 | A1* | 4/2010 | Khan | 375/296 |
| 2011/0228758 | A1* | 9/2011 | Hammarwall et al. | 370/344 |

OTHER PUBLICATIONS

International Search Report corresponding to PCT Application No. PCT/SE2010/050215, Date of Mailing: Oct. 4, 2010.

(Continued)

*Primary Examiner* — Bobbak Safaipour
(74) *Attorney, Agent, or Firm* — Myers Bigel Sibley & Sajovec (57) ABSTRACT

The basic idea of the present invention is to not only design a frequency-selective precoder with respect to the channel properties but also to ensure that the time-domain spread is limited. Hence the energy of the time-domain impulse response of the frequency-selective precoder is concentrated. According to a first embodiment, the time-domain spread is limited by designing a precoder such that it allows smooth transitions in the frequency domain between the values of the precoder when the precoder provides a staircase function. The smooth transitions can either be achieved by lowpass filtering the frequency-domain representation, the staircase function, of the precoder or by designing the precoder such that the sharp jumps are replaced by slopes. According to a second embodiment, the time-domain spread is controlled. The control may be achieved by employing a time-domain parameterization to precisely control the introduced additional time-domain spread.

6 Claims, 6 Drawing Sheets

(56) References Cited

OTHER PUBLICATIONS

International Preliminary Report on Patentability corresponding to PCT Application No. PCT/SE2010/050215, Date of Mailing: Apr. 11, 2011.

Karaa et al. "Linear Precoding for Multiuser MIMO-OFDM Systems" Proceedings of the 2007 IEEE International Conference on Communications, Jun. 24-28, 2007 in Glasgow,United Kingdom, pp. 2797-2802.

Liu et al. "Novel Transmit Beamforming Schemes for Time-Selective Fading Multiantenna Systems" *IEEE Transactions on Signal Processing*, vol. 54. No. 12, pp. 4767-4781, Dec. 1, 2006.

Shen et al. "MIMO-OFDM Beamforming for Improved Channel Estimation" IEEE Journal on Selected Areas in Communications, vol. 26, No. 6, pp. 948-959, Aug. 2008.

Written Opinion of the International Searching Authority corresponding to PCT Application No. PCT/SE2010/050215, Date of Mailing: Oct. 4, 2010.

Ericsson "MU-MIMO for E-UTRA DL L" R1-072464, 3GPP TSG-RAN WG1 #49, Kobe, Japan, May 7-11, 2007.

"Non-codebook-based Precoding for Uplink transmission," 3GPP TSG RAN WG1 #56, Athens, Greece, Feb. 9-13, 2009, 6 pages.

"$3^{rd}$ Generation Partnership Project; Technical Specification Group Radio Access Network; Evolved Universal Terrestrial Radio Access (E-UTRA); Physical Channels and Modulation (Release 8)," 3GPP TS 36.211, V8.9.0 (Dec. 2009), Technical Specification, 83 pages.

\* cited by examiner

METHOD AND ARRANGEMENT IN A CELLULAR COMMUNICATION SYSTEM

CROSS REFERENCE TO RELATED APPLICATIONS

This application is a 35 U.S.C. §371 national stage application of PCT International Application No. PCT/SE2010/050215, filed on 24 Feb. 2010, which claims the benefit of priority of U.S. Provisional Application No. 61/160,475, filed 16 Mar. 2009. The above-referenced PCT International Application was published in the English language as International Publication No. WO 2010/107365 on 23 Sep. 2010. The disclosures of both of the above referenced applications are hereby incorporated herein in their entireties by reference.

TECHNICAL FIELD

The present invention relates to a method and arrangement in a cellular communication system, in particular to a method and an arrangement for precoding.

BACKGROUND

One of the targets in future wireless communication networks, e.g. the LTE (Long Term Evolution), is an Uplink (UL) peak data rate of 500 Mb/s. To achieve this data rate the UL transmission scheme in LTE must be extended to support wider bandwidth and single user spatial multiplexing (SU-MIMO).

In LTE, spatial multiplexing and transmit diversity are specified multi-antenna transmissions schemes. In spatial multiplexing, incoming code blocks are possible split and then mapped to different layers. If diversity is used, the code blocks are copied onto several layers as the same information is to be sent over many channels. The precoder will then take one symbol from each layer and perform a mapping in the frequency domain.

The objective is to achieve a precoding, where the precoded layers are emitted from the transmit antennas with appropriate weighting per each antenna such that the link throughput is maximized at the receiver output.

The precoding in SU-MIMO of LTE can either be based on a predefined codebook or the precoder can take any value referred to as non-codebook based precoding.

In the codebook based precoding, a precoder is chosen out of a predefined set—the codebook—and applied to the Physical Uplink SHared Channel (PUSCH) and possible to the reference signals. Typically the index of the chosen codebook entry—the actual precoder—is known to the receiver. In the context of codebook based UL MIMO, it is expected that the eNodeB will not only determine modulation and coding scheme (MCS) as in Release 8 of the 3GPP-specifications for E-UTRA but also the precoding weights. Transmission parameters comprising MCS and precoding weights (typically expressed as index in code book) are then signaled as part of the downlink control channel information carrying the UL grant to the transmitting UE.

In case that also the reference signals are precoded with the same precoder it is actually not needed that the receiver is aware of the applied precoder.

In non-codebook based precoding the precoder can take any value, and is likely determined by the transmitter. Since the precoder can take any value and no index is signaled to the receiver, the receiver can not make any assumptions on the precoder value. To enable demodulation of PUSCH at the receiver also the reference signals are precoded. Non-codebook based precoding could be illustrated as follows: The terminal can analyze DownLink (DL) channel measurements and calculate the "perfect" precoder for the current DL channel, especially for TDD. Because of channel reciprocity in TDD, UL and DL channel are the same and thus the precoder based on DL measurements matches also the UL and can be applied. The precoder is used directly without quantizing to the nearest codebook entry and thus matches the channel better than a codebook entry would do.

Further, the precoder may be frequency selective or constant over a wider frequency band.

Hence, a frequency-selective precoder changes over frequency. A typical granularity over which a frequency-selective precoder is constant could be for example one or several resource blocks. But also precoders varying with every sub-carrier are possible. In case of wideband precoding a single precoder is used across the allocated bandwidth.

Together with codebook-based precoding a wideband precoder has the advantage that signaling is reduced since only a single precoder index needs to be signaled for the whole bandwidth. However, using a single precoder over a wide bandwidth leads to sub-optimal performance.

For non-codebook based precoding no precoder indices needs to be signaled and thus a more frequency-selective precoder can be used.

In LTE so far it has only been specified UL transmissions from a single antenna port at a time. What however is possible with the current framework is simultaneous transmission of multiple terminals on the same time-frequency resources, a.k.a. Multi-User MIMO (MU-MIMO) or spatial domain multiple access. From a terminal perspective this transmission mode is the same as the standard single-antenna port UL transmission, only the base station is required to implement a special receiver for this transmission mode.

In order to estimate the propagation channels between the various terminals and the base station mutually orthogonal reference signals are needed. In LTE these reference signals are defined in frequency-domain which is further explained in 3GPP TS36.211, $$r^{(\alpha)}(n) = e^{j\alpha n} \bar{r}(n), n=0,1,\ldots,M_{SC}^{RS}-1, \quad (1)$$

with $M_{SC}^{RS} = mN_{SC}^{RB}$ the number of allocated subcarriers. The sequence $r^{(\alpha)}(n)$ is directly mapped onto the allocated subcarriers without DFT precoding. Multiplication of the base sequence $\bar{r}(n)$ with the complex exponential function in frequency domain results in a cyclic shift of $$\frac{N}{12} n_{CS}$$

samples of the time-domain base sequence, $\alpha = 2\pi n_{CS}/12$ (N is the size of the IDFT used in the modulator). The base sequence $\bar{r}(n)$ is cell specific. It has constant magnitude resulting that the time-domain sequence (application of IDFT to $\bar{r}(n)$) has a perfect periodic autocorrelation function. Because of this property all sequences derived via (1) are orthogonal to each other.

Equation (1) together with the definition of a reveals that in total 12 different cyclic shifts ($n_{CS}=0, 1, \ldots, 11$) exist resulting each in a different sequence $r^{(\alpha)}(n)$. However, in LTE only a 3-bit field is specified to signal $n_{CS}$ (and thus $\alpha$) resulting in 8 possible cyclic shifts and thus 8 orthogonal reference signals. Table 1 below shows the table defined in 3GPP TS 36.211 specifying the cyclic shifts. The signaled parameter $n_{DMRS}^{(2)}$ determines the cyclic shift value according to $$n_{CS} = (n_{DMRS}^{(1)} + n_{DMRS}^{(2)} + n_{PRBS}) \bmod 12, \quad (2)$$

with $n_{DMRS}^{(1)}$ and $n_{PRBS}$ being cell specific parameter. $n_{DMRS}^{(2)}$ is signaled to the terminal as part of the UL scheduling grant message. Table 1 below specifies the cyclic shifts.

| Cyclic Shift Field in DCI format 0 [3] | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

For SU-MIMO orthogonal reference signals for each transmission layer or transmission antenna are needed. One possibility is to assign sequences with different cyclic shifts to the different layers or antennas.

SUMMARY

Thus the object of the present invention is to achieve a non-codebook based precoder and a method for determining the characteristics of the non-codebook based precoder.

That can be achieved by concentrating the energy of the time-domain response of a frequency-selective precoder. The concentration of the energy can be achieved by selecting precoder characteristics allowing smooth transitions in the frequency-domain between the values of the precoder or by controlling time-domain spread of the precoder according to embodiments of the present invention.

Thus according to a first aspect of the present invention a method in a transmitter for selecting characteristics of a precoder of the transmitter in a cellular network is provided. The precoder is frequency selective and is configured to take any value which is unknown by the receiver of a node in the cellular network. In the method, energy of the time-domain impulse response of the frequency-selective precoder is concentrated.

According to a second aspect of the present invention a transmitter in a cellular network is provided. The transmitter comprises a precoder and the transmitter is configured to select characteristics of the precoder. Further, the precoder is frequency selective and is configured to take any value which is unknown by a receiver of a node in the cellular network. The transmitter comprises a concentrator configured to concentrate energy of the time-domain impulse response of the frequency-selective precoder.

An advantage with embodiments of the present invention is that the length of the effective channel impulse response is reduced. That results in better channel estimation performance and that the orthogonality among reference signals derived from the same base function by cyclic shifting is improved.

DETAILED DESCRIPTION

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The embodiments of the present invention apply to a frequency-selective precoder of a transmitter, wherein the precoder parameters are not signaled to the receiver. The transmitter is typically located in a User Equipment (UE) communicating with a base station, referred to as eNodeB in an LTE network, or communicating with a relay, but the transmitter can also be implemented in a relay communicating with another relay or a base station.

When using a precoder at the UE, the signal received at subcarrier k by the eNodeB per receive antenna (ignoring noise) stemming from one transmission layer can be written as $$Y(k)=X(k)\cdot H_{pre}(k)\cdot H(k), k=0,1,\ldots,N-1, \quad (3)$$

with $X(k)$ as the transmitted signal and $H(k)$ and $H_{pre}(k)$ as the transfer function of the channel and of the precoder, respectively. Equation (3) indicates that the impact of the precoding can be seen as additional transfer function. The precoder $H_{pre}(k)$ varies among the transmission layers. In case that no precoding or constant precoding across the transmission bandwidth is applied the precoder reduces to $H_{pre}(k)=1$ or $H_{pre}(k)=const$, respectively.

In the more general case the precoder is described by the $N_{TX} \times N_L$ matrix $$H_{pre}(k) = \begin{pmatrix} H_{pre}^{1,1}(k) & \ldots & H_{pre}^{1,N_L}(k) \\ \vdots & \ddots & \vdots \\ H_{pre}^{N_{TX},1}(k) & \ldots & H_{pre}^{N_{TX},N_L}(k) \end{pmatrix}, \quad (4)$$

with $N_L$ and $N_{TX}$ the number of transmission layers and number of transmit antennas, respectively. Each element of this matrix is a frequency dependent transfer function. Even though the embodiments of the present invention is described below based on a single precoder element $H_{pre}(k)$ it should be noted that the whole precoder is actually described by a matrix and the invention is applicable to each matrix element.

In case that precoding is applied to both PUSCH and reference signals—as it is for non-codebook based precoding—equation (3) is valid for both signals. By repeating equation (3) for the reference signals equation (5) is obtained.

$$Y_{RS}(k)=X_{RS}(k)\cdot H_{pre}(k)\cdot H(k), k=0,1,\ldots,N-1 \quad (5)$$

For non-codebook based precoding where the used precoder is not known to the receiver it is impossible to distinguish between $H_{pre}(k)$ and $H(k)$ at the receiver. To the receiver, equation (5) looks like transmission of reference signals over an effective channel $H_{eff}(k)=H_{pre}(k)\cdot H(k)$. Since the same precoding is applied to both reference signals and PUSCH both transmissions are impacted by the same effective channel and demodulation is therefore possible. In time-domain the effective channel impulse response is $h_{eff}(n)=h_{pre}(n)*h(n)$ with "*" denoting circular convolution.

Orthogonal reference signals $X_{RS}(k)$ are transmitted at the different transmission layers to enable channel estimation. In LTE orthogonal reference signals are generated by cyclic shifting a base sequence.

Figure 1:
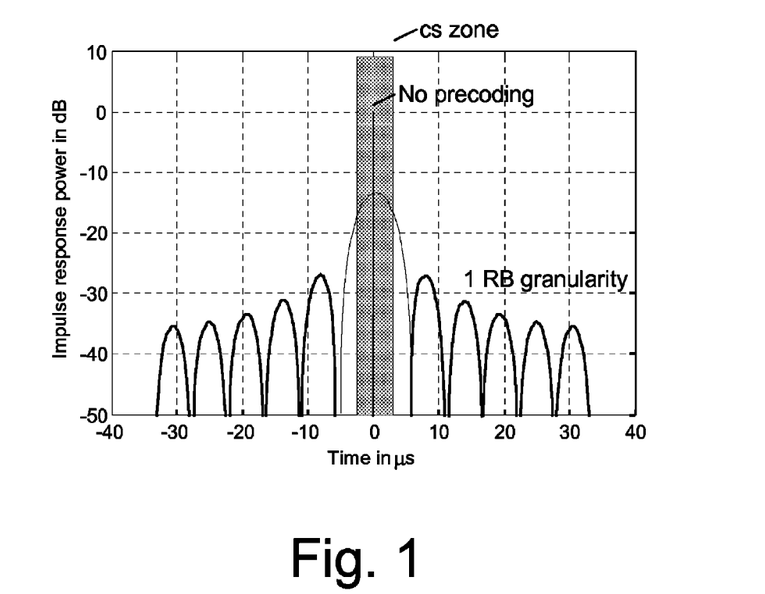
FIG. 1 illustrates average tap power of $h_{pre}(n)$ for a frequency-selective precoder $H_{pre}(k)$ with a granularity of 1 RB according to prior art. The grey shaded area "cs zone" marks the minimum cyclic shift length two reference signals are separated.
Figure 2:
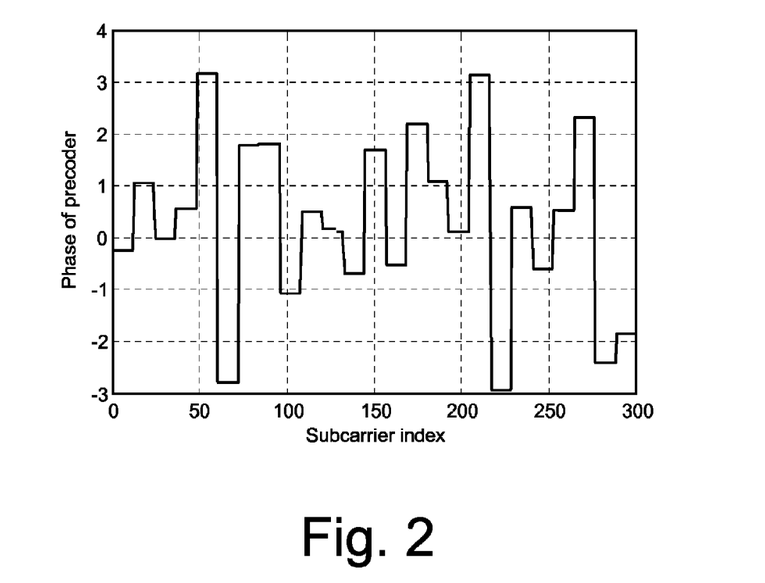
FIG. 2 illustrates a realization of a precoder $H_{pre}(k)$ with a granularity of 1 RB according to prior art.

FIG. 1 shows average tap power of $h_{pre}(n)$ for a frequency-selective precoder $H_{pre}(k)$ with a granularity of 1 RB (resource block), i.e. the precoder changes every resource block. One resource block is 180 kHz. The grey shaded area "cs zone" marks the minimum cyclic shift length two reference signals are separated. It is furthermore assumed that the precoder is unitary, i.e. it applies only a phase change. A realization of such a precoder with a frequency granularity of 1 RB is depicted in FIG. 2.

Figure 3:
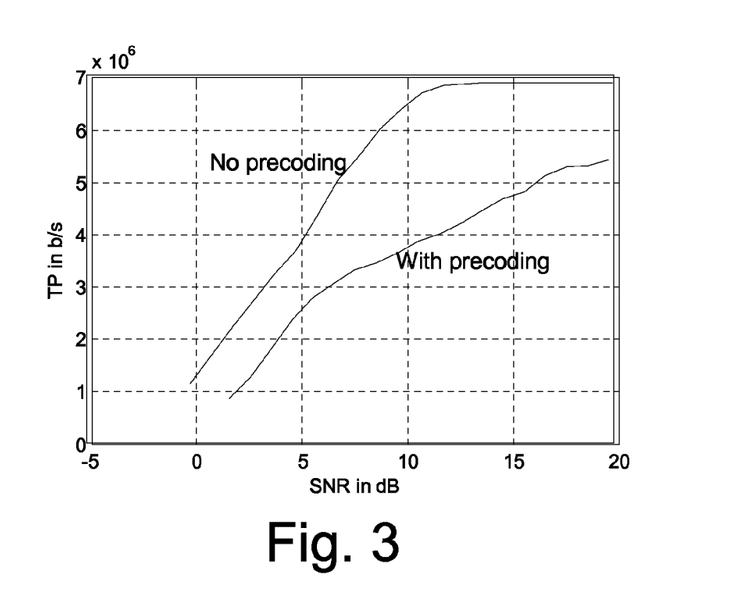
FIG. 3 illustrates the throughput of a SIMO system with and without frequency-selective precoding according to prior art. The modulation scheme is 16QAM with code rate ½, the number of allocated resource blocks is 25, and the used channel estimator is realistic.

As can be seen from FIG. 1 already $h_{pre}(n)$ has a large support spanning several µs. The effective impulse response—which is the convolution of $h_{pre}(n)$ and the channel $h(n)$—will be dominated by $h_{pre}(n)$. This leads to two problems:

Firstly, since $h_{pre}(n)$ is unknown at the receiver not only $h(n)$ but $h_{eff}(n)$ needs to be estimated. Since $h_{eff}(n)$ is much longer than $h(n)$ this estimation problem is more complex and more error-prone. FIG. 3 shows the throughput performance of a SIMO system without precoding and a SIMO system where a frequency selective precoder with 1 RB granularity is applied. Since non-codebook based precoding is assumed the precoder is not known at the receiver. The modulation scheme is 16QAM with code rate ½, the number of allocated resource blocks is 25, and the used channel estimator is realistic.

Secondly, $h_{pre}(n)$ alone results in a substantial tap energy outside 67 µs/12=5.55 µs, i.e. outside the grey shaded area in FIG. 1, the amount orthogonal reference signals in the uplink are cyclic shifted. Two reference signals created by a cyclic shift of 5.55 µs are no longer orthogonal but interfere with each other.

Figure 9:
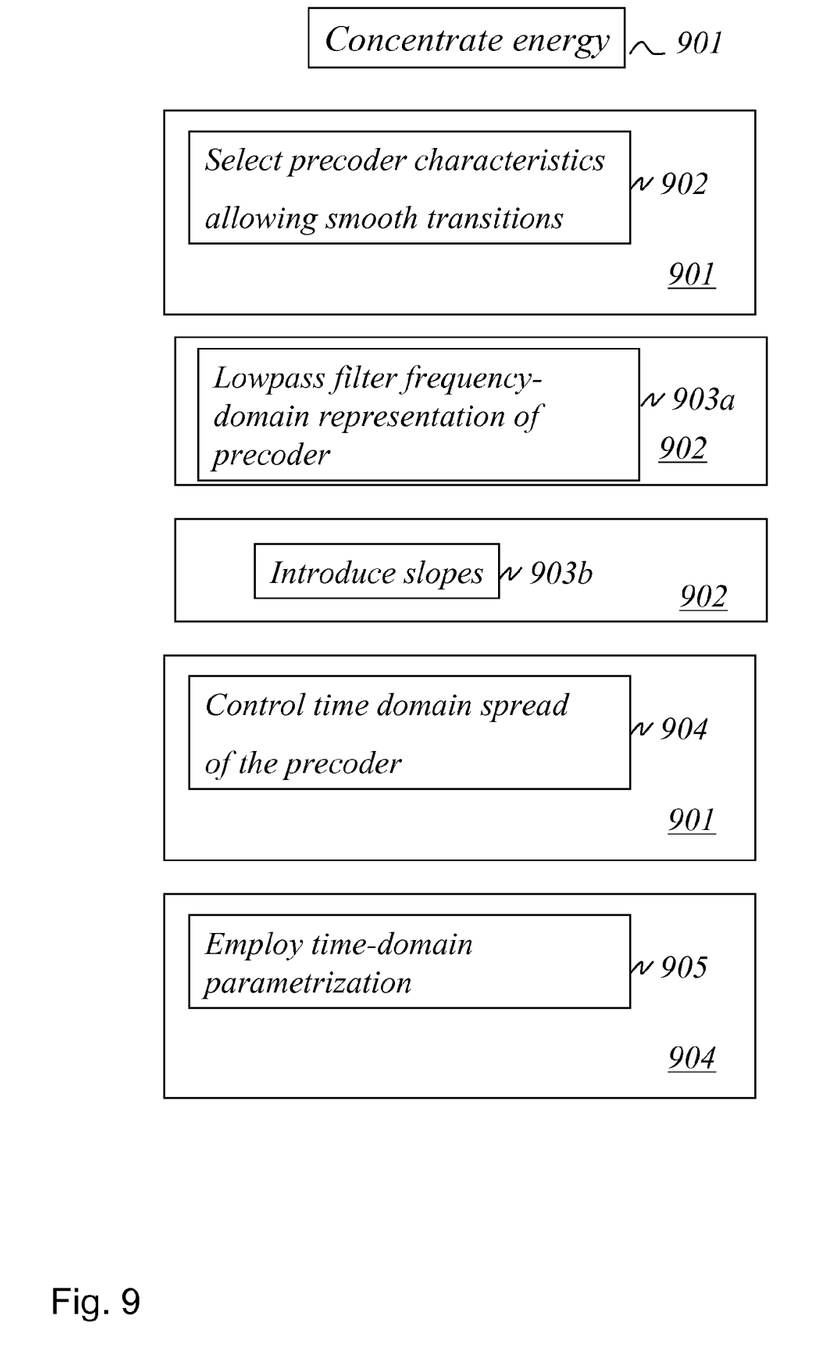
FIG. 9 are flowcharts of the method according to embodiments of the present invention.

The basic idea of the present invention is to not only design a frequency-selective precoder with respect to the channel properties but also to ensure that the time-domain spread is limited. Hence, as illustrated in the flowchart of FIG. 9, the energy of the time-domain impulse response of the frequency-selective precoder is concentrated 901.

Figure 4:
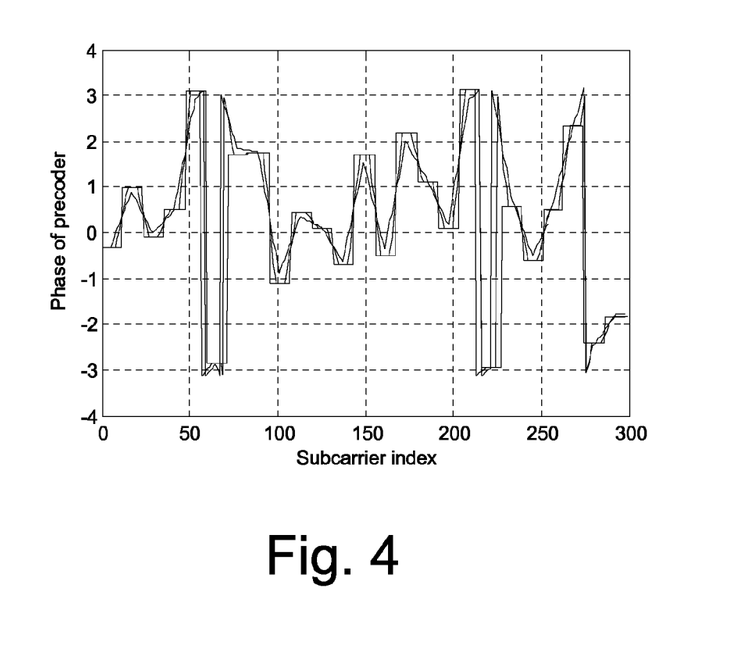
FIG. 4 illustrates a realization of a precoder $H_{pre}(k)$ with a granularity of 1 RB according to an embodiment of the present invention. In addition to a precoder with step-wise transitions also precoder with smooth transitions over 6 and 12 subcarriers are shown.

According to a first embodiment, the time-domain spread is limited by designing 902 a precoder such that it allows smooth transitions in the frequency domain between the values of the precoder when the precoder provides a staircase function as illustrated in FIG. 2. Thus the smooth transitions result in a precoder as illustrated in FIG. 4. The smooth transitions can either be achieved by lowpass filtering 903a the frequency-domain representation, the staircase function, of the precoder or by designing the precoder such that the sharp jumps are replaced by slopes. The introduced 903b slopes may be linear slopes but not necessarily limited to. Further, the limitation of the frequency granularity, i.e. that the precoder is constant (before any slopes are introduced) over several RBs, helps to concentrate the energy in time-domain.

According to a second embodiment, the time-domain spread is controlled 904. The control may be achieved by employing 905 a time-domain parameterization to precisely control the introduced additional time-domain spread.

The first embodiment will now be further explained in conjunction with FIG. 4. FIG. 4 shows the precoder illustrated in FIG. 2 with the addition of the smooth transitions between the different values over 6 and 12 subcarriers.

Figure 5:
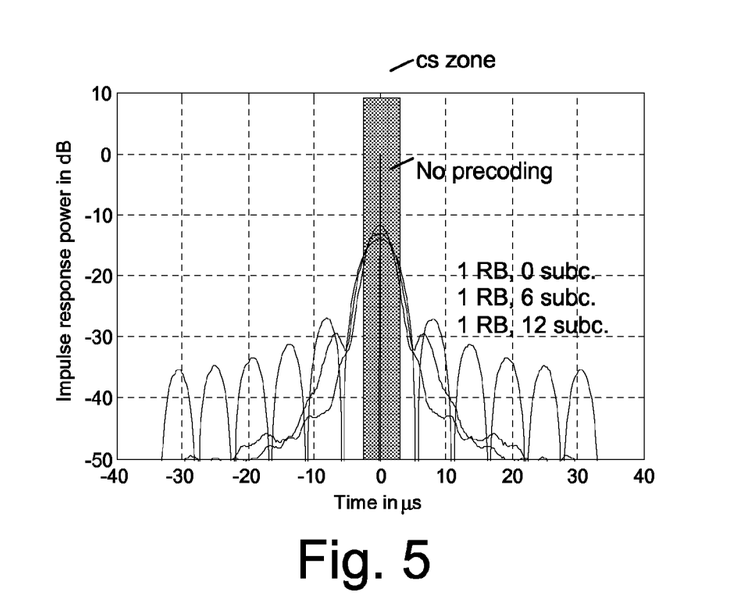
FIG. 5 illustrates average tap power of $h_{pre}(n)$ for frequency-selective precoder $H_{pre}(k)$ with a granularity of 1 RB according to embodiments of the present invention. In addition to precoder with step-wise transitions also precoder with smooth transitions over 6 and 12 subcarriers are shown.
Figure 6:
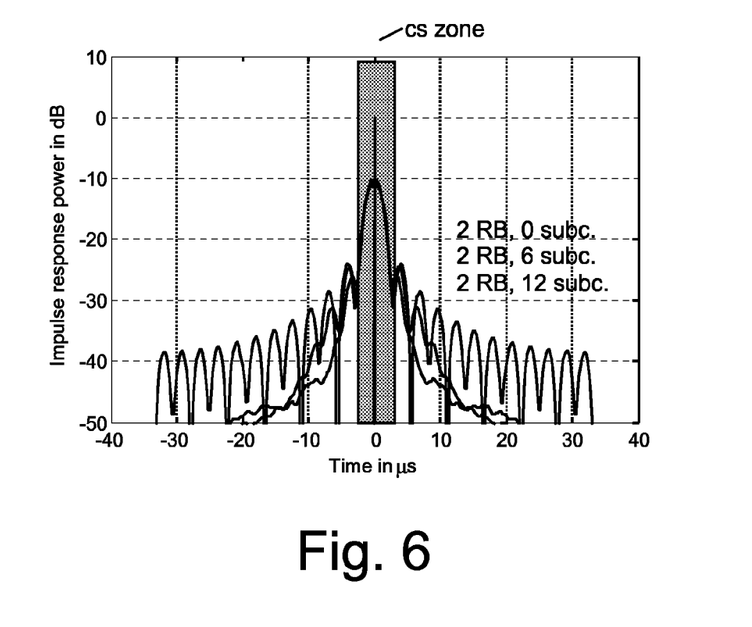
FIG. 6 illustrates average tap power of $h_{pre}(n)$ for frequency-selective precoder $H_{pre}(k)$ with a granularity of 2 RB according to embodiments of the present invention. In addition to precoder with step-wise transitions also precoder with smooth transitions over 6 and 12 subcarriers are shown.
Figure 7:
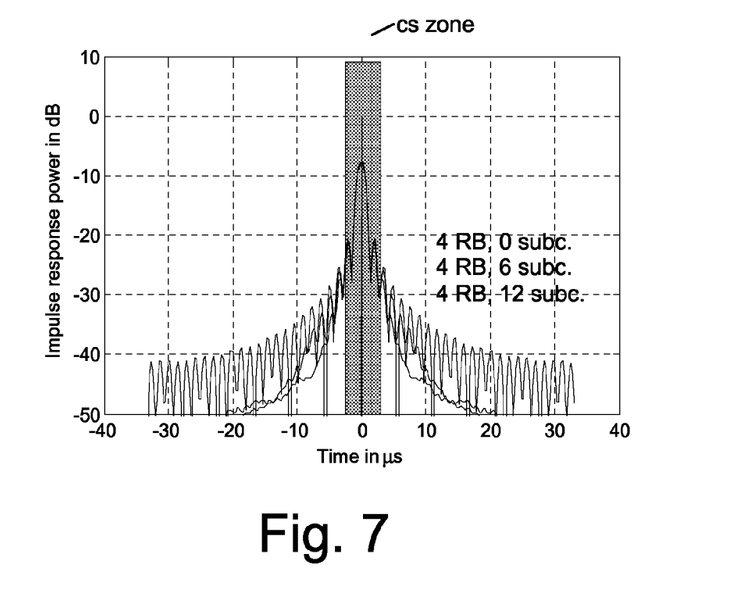
FIG. 7 illustrates average tap power of $h_{pre}(n)$ for frequency-selective precoder $H_{pre}(k)$ with a granularity of 4 RB according to embodiments of the present invention. In addition to precoder with step-wise transitions also precoder with smooth transitions over 6 and 12 subcarriers are shown.

FIG. 5 illustrates the average tap power as shown in FIG. 1. Furthermore FIG. 5 depicts the average tap powers for precoder with smooth transitions according to the first embodiment. The energy outside the grey shaded area—the basic cyclic shift length of 5.55 µs—decreases with increasing number of transition subcarriers. In FIGS. 6 and 7, it is shown that the energy outside the grey shaded area—the basic cyclic shift length of 5.55 µs—decreases with a limitation of the frequency granularity. FIGS. 6 and 7 show the case of a precoder with a frequency granularity of 2 RBs and 4 RBs, respectively. The shown precoders allow smooth and step-wise transitions over 6 and 12 subcarriers.

Figure 8:
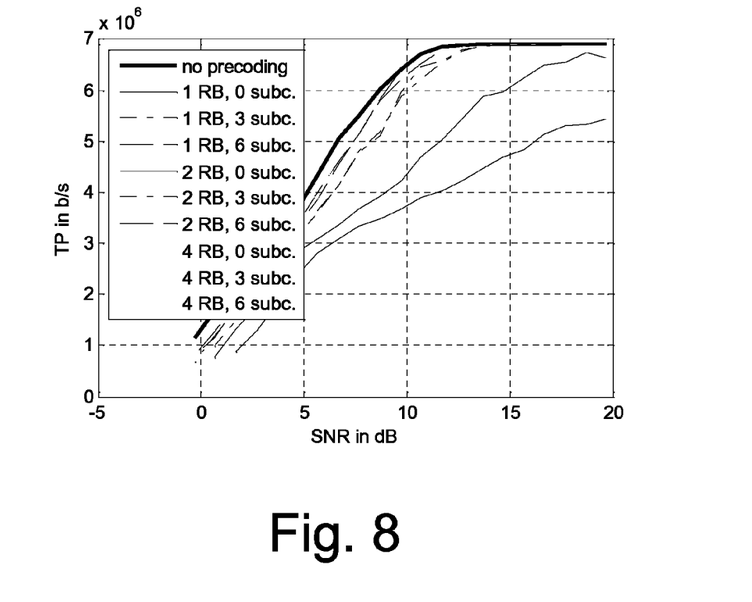
FIG. 8 illustrates the throughput of a SIMO system with and without frequency-selective precoding according to embodiments of the present invention. The modulation scheme is 16QAM with code rate ½, the number of allocated resource blocks is 25, and the used channel estimator is realistic.

FIG. 8 shows the throughput of various combinations of precoder granularity and number of transition subcarriers. The precoder is not known at the receiver. Performance improves with decreasing granularity and increasing transition region in frequency-domain, since both these features help to concentrate the energy. The reason why precoding shows inferior performance to no precoding is that only a SIMO system is simulated which captures only the negative effects of frequency-selective non-codebook based precoding—degraded channel estimation. The modulation scheme is 16QAM with code rate ½, the number of allocated resource blocks is 25, and the used channel estimator is realistic.

Based on the results above it is according to embodiments of the present invention proposed to include the time-spread of the precoder, i.e. the impulse response of the precoder $H_{pre}(k)$, as criteria when designing the frequency-selective precoder which is unknown to the receiver. In the frequency-domain this criteria manifests itself by avoiding step-wise and other rapid transitions and instead using smooth transitions as illustrated in FIG. 4.

In case of a piece-wise constant precoder, transitions between different values will be smooth by inserting transition regions spanning over one or multiple subcarriers. For a unitary precoder—where the precoder only changes phase—this implies smooth phase transitions. Even though demonstrated above with linear phase transitions other transitions can be envisioned as well.

The limitation of the frequency granularity of the precoder also reduces the time-spread of the precoder, as shown in FIGS. 5-7.

According to a second embodiment of the present invention, another way to limit the additional time dispersion is to employ a time-domain model parameterization. This allows very precise control of the introduced additional time dispersion. In the time-domain, the precoder is enforced to have the impulse response $$h_{pre}(n) = \sum_{l=1}^{L} H_{pre,l} \delta(n - \tau_l), \quad (6)$$

where $\delta(\cdot)$ denotes the Kronecker delta, L is the number of taps, and $\tau_l$ and $h_{pre,l}$ are the delay and the complex value of tap $l=1, \ldots, L$. Under the assumption that the taps are order in the sense that $\tau_l < \tau_{l+1}$ and that the delay of the first tap is zero, the additional time dispersion introduced by the precoder is simply $\tau_L$, the delay of the last tap.

The precoder then has the frequency response $$H_{pre}(f_k) = \sum_{l=1}^{L} h_{pre,l} e^{j2\pi f_k \tau_l}, k = 0, 1, \ldots, N-1. \quad (7)$$

where $f_k$ is the frequency of subcarrier k. Typically the precoder is calculated at subcarrier frequencies $f_k$, however, it is of course also possible to include intermediate frequencies between subcarriers. As can be seen, this precoder is frequency dependent and performance improvements can be obtained as compared to the case with no frequency dependent precoding, for example by means of matching the precoder to the frequency selective channel better while still being able to precisely trade frequency selectivity to time dispersion.

The parameters of the precoder in (6) can be chosen in several ways, an example is to select the parameters of the time domain model parameterization to maximize the received power. There may be an agreed or standardized or interchanged set of delays or maximal allowed delay and then the complex values of the precoder are chosen for example to maximize the received signal power, i.e. to maximize $$\sum_k |H^*(k) H_{pre}(k)|^2,$$

subject to a constraint on the total transmit power, $$\sum_k |H_{pre}(k)|^2,$$

which is equal to a constant. In case of multiple transmit antennas, the criteria and constraints can be easily extended to also sum over the multiple transmit antennas. In case of colored interference noise, this could be included in the criteria as well, for example by whitening the signals first. It should be noted the optimization criteria becomes quadratic in the parameters $h_{pre,l}$, $l=1, \ldots, L$ and are hence solved in a straight forward manner for a person skilled in the art of linear algebra. At the same time, especially in the case with MIMO transmission, it is envisioned that more involved optimization criteria can be used. The important aspect to note is that the precoders can be parameterized as in equation (7) and the resulting structure is hence in some sense similar to a space-time transmission filter.

The criteria discussed above regarding the smoothness, "degree" of smoothness, maximum time-spread of precoder impulse response, delays of time-domain model, allowed granularity, etc can either be fixed in the standard or they can be signaled to the transmitter, e.g. the UE, by the base station.

The embodiments of the present invention relates to a transmitter comprising the precoder. The transmitter may be a UE 1009 as exemplified in FIG. 10, wherein the UE 1009 is adapted to communicate with a base station or relay 1007. It should be noted that the transmitter may also be a relay configured to communicate with another relay or a base station. It should be noted that although the device indicated as 1009 is denoted as transmitter, the transmitter comprises RF functionalities 1010 such as receiving and transmitting functionalities. However, the device indicated as 1009 is referred to as transmitter since the embodiments of the present invention relates to precoding of signals 1013 to be transmitted from one unit to another, i.e. from the transmitter 1009 to the receiver 1007. The same is valid for the receiver.

Figure 10:
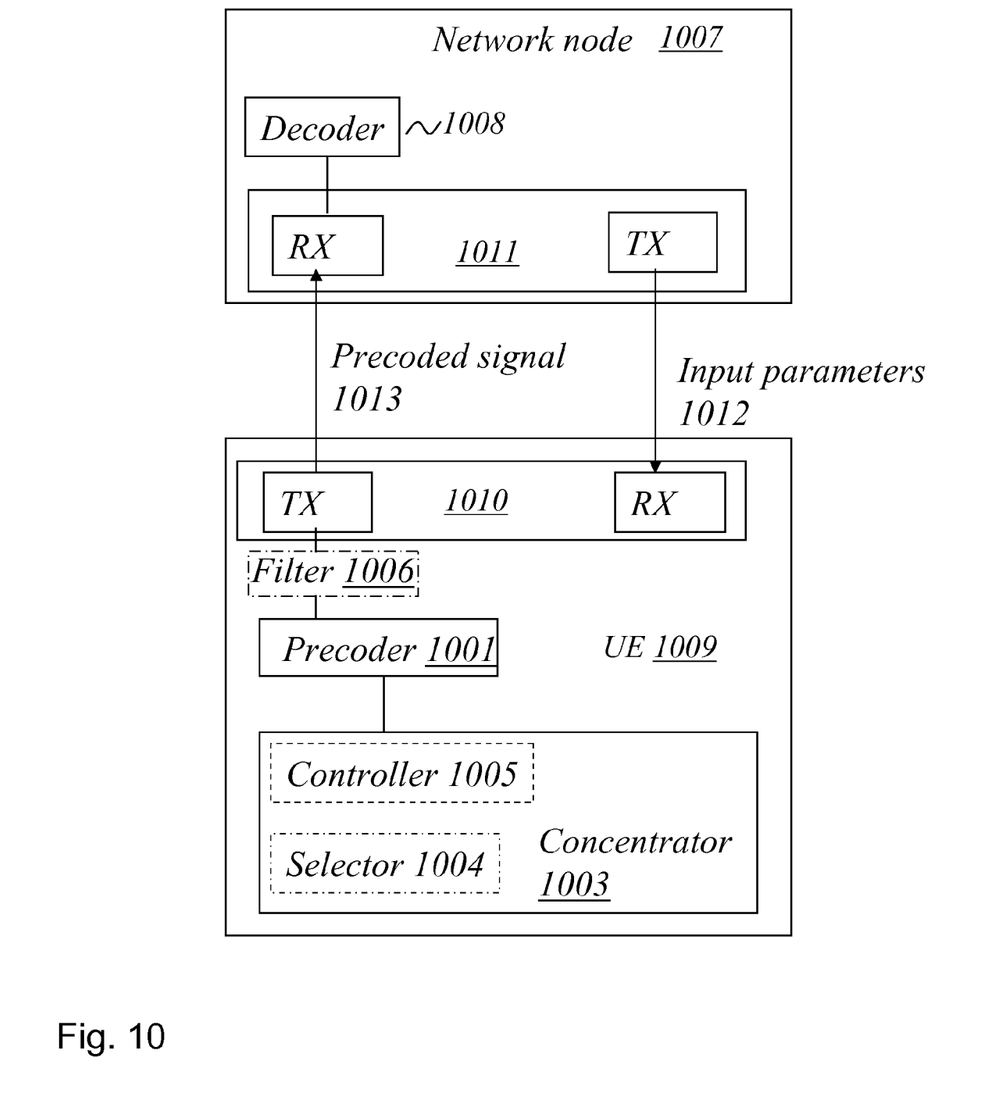
FIG. 10 shows a UE according to embodiments of the present invention.

When the precoder 1001 is implemented in a UE 1009, the UE 1009 is configured to select characteristics of the precoder 1001. The precoder 1001 is frequency selective and is configured to take any value which is unknown by a receiver of a node in the cellular network. I.e. the precoder is a non-code book based precoder. Furthermore, the UE 1009 comprises a concentrator 1003 configured to concentrate energy of the time-domain impulse response of the frequency-selective precoder 1001.

According to the first embodiment, the concentrator 1003 which is configured to concentrate the energy of the time-domain impulse response of the frequency-selective precoder 1003 comprises a selector 1004 configured to select precoder characteristics allowing smooth transitions in the frequency-domain between the values of the precoder. The energy of the time-domain impulse response of the frequency-selective precoder may be concentrated by configuring the precoder such that the sharp jumps are replaced by transition slopes. Alternatively, a low-pass filter 1006 may be included to filter the frequency-domain representation of the precoder to obtain the smooth transitions.

Moreover, the concentrator 1003 may be configured to concentrate the energy of the time-domain impulse response of the frequency-selective precoder by limiting the frequency granularity of the precoder.

According to the second embodiment, the concentrator 1003 which is configured to concentrate the energy of the time-domain impulse response of frequency-selective precoder 1003 comprises a controller 1005 configured to control time-domain spread of the precoder. Furthermore, the controller 1005 may be configured to employ a time-domain model parameterization of the impulse response of the precoder to control the additional time dispersion introduced by the precoder 1001 and to select parameters of the time domain model parameterization to maximize the received power.

Accordingly, the receiver 1007 which is a network node such as a base station or relay in the scenario exemplified in FIG. 10 comprises RF functionalities 1011 for receiving the precoded signals and a decoder 1008 for decoding the received precoded signals. Moreover, the RF functionalities also comprises transmitting functionalities for transmitting input parameters 1012 to the UE e.g. concerning maximum allowed delay spread of the precoder, tap delays of the precoder, parameters defining transition slope and allowed frequency-domain granularity of the precoder. As stated above, the UE comprises receiving functionalities 1010 for receiving said input parameters.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a communication device in a cellular network to select characteristics of a frequency-selective precoder for a transmitter of the communication device, wherein the frequency selective precoder is frequency selective and is configured to take any value which is unknown by a receiver of a node in the cellular network, the method comprising:

concentrating energy of a time-domain impulse response of the frequency-selective precoder by controlling time-domain spread of the frequency-selective precoder, wherein controlling time-domain spread comprises employing a time-domain model parameterization of the time-domain impulse response of the frequency-selective precoder to control additional time dispersion introduced by the frequency-selective precoder.

2. The method according to claim 1, wherein parameters of the time domain model parameterization are selected to increase and/or maximize received power.

3. A communication device in a cellular network, the communication device comprising:

a transmitter;

a frequency-selective precoder for the transmitter, wherein the frequency-selective precoder is frequency selective and is configured to take any value which is unknown by a receiver of a node in the cellular network; and a concentrator configured to select characteristics of the frequency selective precoder, wherein the concentrator is further configured to concentrate energy of a time-domain impulse response of the frequency-selective precoder, wherein the concentrator is configured to concentrate the energy of the time-domain impulse response of the frequency-selective precoder by controlling a time-domain spread of the frequency-selective precoder, wherein the concentrator is configured to control the time-domain spread by employing a time-domain model parameterization of the impulse response of the frequency-selective precoder to control additional time dispersion introduced by the frequency-selective precoder.

4. The communication device according to claim 3, wherein the concentrator is configured to select parameters of the time-domain model parameterization to increase and/or maximize received power.

5. The communication device according to claim 3, wherein the communication device comprises a User Equipment, wherein the transmitter is located in the User Equipment, and wherein the receiver is located in a base station and/or a relay of the cellular network.

6. The communication device according to claim 3, wherein the communication device comprises a first relay, wherein the transmitter is located in the first relay, and wherein the receiver is located in a second relay or a base station.

* * * * *

UNITED STATES PATENT AND TRADEMARK OFFICE
CERTIFICATE OF CORRECTION

PATENT NO. : 8,655,394 B2
APPLICATION NO. : 13/256341
DATED : February 18, 2014
INVENTOR(S) : Baldemair et al.

It is certified that error appears in the above-identified patent and that said Letters Patent is hereby corrected as shown below:

In the Specification

In Column 4, Line 34, delete "are flowcharts of the" and insert -- is a flowchart of the --, therefor.

In Column 5, Lines 38-39, in Equation (5), delete "$Y_{RS}(k)=X_{RS}(k) \cdot H_{pre}(k) \cdot H(k), k=0,1,\ldots,N-1$" and insert -- $Y_{RS}(k)=X_{RS}(k) \cdot H_{pre}(k) \cdot H(k),\ k=0,1,\ldots,N-1.$ --, therefor.

In Column 7, Lines 31-32, in Equation (6), delete "$h_{pre}(n) = \sum_{i=1}^{L} H_{pre,l}\delta(n-\tau_l),$" and insert -- $h_{pre}(n) = \sum_{i=1}^{L} h_{pre,l}\delta(n-\tau_l);$ --, therefor.

In Column 7, Line 38, delete "1==1,...., L." and insert -- 1=1,...., L. --, therefor.

In Column 8, Lines 58-59, delete "precoder 1003" and insert -- precoder 1001 --, therefor.

In Column 9, Lines 7-8, delete "precoder 1003" and insert -- precoder 1001 --, therefor.

Signed and Sealed this
Second Day of December, 2014

Michelle K. Lee
*Deputy Director of the United States Patent and Trademark Office*